(12) United States Patent
Hishinuma (10) Patent No.: US 11,279,094 B2
(45) Date of Patent: Mar. 22, 2022

(54) HEAT-SEALING APPARATUS AND METHOD FOR FORMING COMPOSITE HEAT SEAL STRUCTURE

(71) Applicant: Kazuo Hishinuma, Kanagawa (JP)

(72) Inventor: Kazuo Hishinuma, Kanagawa (JP)

(*) Notice: Subject to any disclaimer, the term of this patent is extended or adjusted under 35 U.S.C. 154(b) by 209 days.

(21) Appl. No.: 16/705,242

(22) Filed: Dec. 6, 2019

(65) Prior Publication Data
US 2020/0108566 A1 Apr. 9, 2020

Related U.S. Application Data

(63) Continuation of application No. PCT/JP2018/001490, filed on Jan. 19, 2018.

(30) Foreign Application Priority Data

Jun. 9, 2017 (JP) .............................. JP2017-114175

(51) Int. Cl.
*B29C 65/76* (2006.01)
*B29C 65/30* (2006.01)
(Continued)

(52) U.S. Cl.
CPC .............. *B29C 65/76* (2013.01); *B29C 65/30* (2013.01); *B29C 66/8145* (2013.01);
(Continued)

(58) Field of Classification Search
CPC .... B65D 75/5855; B65D 77/38; B65D 31/10; B29C 65/76; B29C 65/7855; B29C 65/7873; B29C 65/7891; B29C 65/7894; B29C 66/20; B29C 66/23; B29C 66/4312; B29C 66/43121; B29C 66/81427; B29C 66/81429; B29C 66/81433;
(Continued)

(56) References Cited

U.S. PATENT DOCUMENTS 2,697,773 A * 12/1954 Gordon .................... B29C 59/04
219/775
2,743,761 A * 5/1956 Carson .............. B29C 66/83411
156/583.3
(Continued)

FOREIGN PATENT DOCUMENTS

JP 3465741 B2 11/2003
JP 3811145 B2 8/2006
(Continued)

OTHER PUBLICATIONS

Written Opinion in PCT Application No. PCT/JP2018/001490, dated Feb. 13, 2018, 9pp.
International Search Report in PCT Application No. PCT/JP2018/001490, dated Feb. 13, 2018, 5pp.
(Continued)

*Primary Examiner* — John L Goff, II
(74) *Attorney, Agent, or Firm* — Hauptman Ham, LLP (57) ABSTRACT

A heat-sealing apparatus for forming a composite heat seal structure, includes a belt conveying, heating and press bonding portion configured to convey and heat a heat seal material to form a band-shaped peelable seal, and a die roll press bonding portion configured to add a linear peelable seal to the band-shaped peelable seal in a longitudinal direction of the band-shaped peelable seal for forming the composite heat seal structure.

11 Claims, 8 Drawing Sheets

(51) Int. Cl.
  *B29C 65/00*    (2006.01)
  *B65B 51/18*    (2006.01)

(52) U.S. Cl.
  CPC .. *B29C 66/81427* (2013.01); *B29C 66/83413* (2013.01); *B29C 66/83423* (2013.01); *B29C 66/849* (2013.01); *B65B 51/18* (2013.01)

(58) Field of Classification Search
  CPC .......... B29C 66/81435; B29C 66/8341; B29C 66/83413; B29C 66/83423; B29C 66/849; B29C 66/8491; B29C 66/851; B29C 66/8511; B29C 66/8145; B29C 66/346; B29C 66/81457; B29C 66/1352; B29C 66/81422; B29C 66/43122; B29C 66/43123; B29C 66/3452; B29L 2031/7128; B65B 51/18; B65B 51/16; Y10T 156/17; Y10T 156/1712; Y10T 156/1741
  See application file for complete search history.

(56) References Cited

U.S. PATENT DOCUMENTS

| | | | | |
|---|---|---|---|---|
| 3,326,735 | A | * | 6/1967 | Beason, Jr. ....... B29C 66/81422 156/273.7 |
| 5,282,349 | A | * | 2/1994 | Siegel ................ B29C 66/7234 53/433 |
| 2017/0121083 | A1 | | 5/2017 | Hishinuma |
| 2018/0334302 | A1 | | 11/2018 | Hishinuma |

FOREIGN PATENT DOCUMENTS

| | | |
|---|---|---|
| JP | 4623662 B2 | 2/2011 |
| JP | 5779291 B1 | 9/2015 |
| JP | 6032450 B1 | 11/2016 |

OTHER PUBLICATIONS

International Written Opinion in PCT Application No. PCT/JP2018/001490, dated Feb. 13, 2018, 3pp.

* cited by examiner

PRIOR ART

Fig. 4

PRIOR ART

Details of temperature regulating portion

Fig. 13

HEAT-SEALING APPARATUS AND METHOD FOR FORMING COMPOSITE HEAT SEAL STRUCTURE

RELATED APPLICATIONS

The present application is a continuation of International Application Number PCT/JP2018/001490, filed Jan. 19, 2018, which claims priority from Japanese Application Number 2017-114175, filed Jun. 9, 2017, the disclosures of which application are hereby incorporated by reference herein in their entirety.

TECHNICAL FIELD

This application relates to a heat-sealing apparatus and a method for forming a composite heat seal structure where a linear peelable seal is added to a band-shaped peelable seal in a longitudinal direction.

BACKGROUND ART

Figure 1:
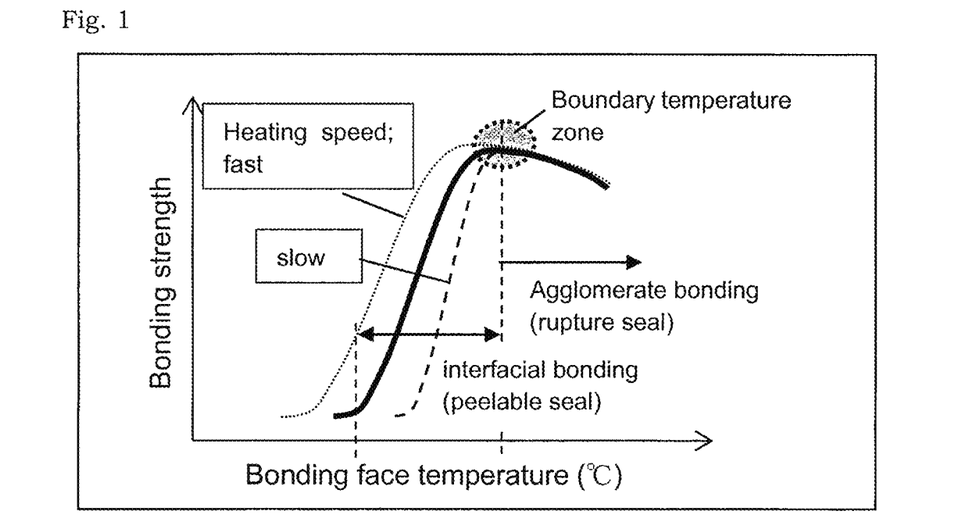
[FIG. 1] is a graph illustrating schematically the relationship between welding face temperature and bonding strength.

Flexible packaging bags to which a plastic film or sheet is applied are sealed by heat bonding (heat seal) utilizing the thermoplasticity of plastics. As shown in FIG. 1, the strength of heat bonding elevates in the state of interfacial bonding (peelable seal) between bonding faces with temperature elevation of bonding face caused by the softening of adhesive. When the bonding face reaches a molten state, the adhesive layer (sealant layer) becomes in a paste state. Then, when the bonding face is cooled, it becomes agglomerate bonding (rupture seal) in a molded state (integrated). As shown in FIG. 1, welding face temperature (heating temperature) and heating speed are parameters of the bonding strength in the above interfacial adhesion (Hishinuma effect).

Thus, in the heat seal, there are peelable seal where bonding faces are separable, and rupture seal where bonding faces are not separable, and expectation of complete application of peelable seal rises in view of the convenience of opening.

Figure 2:
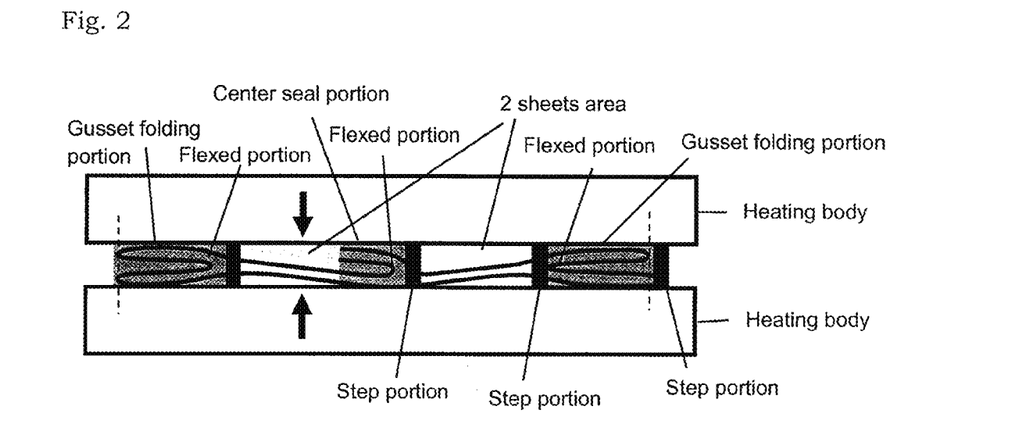
[FIG. 2] is a cross sectional view of a gusset bag applied to press bonding by heating bodies.

There are several types of bags formed by heat seal. Among them, in the case of a gusset bag and the like, the number of the film or sheet forming the bag increases at the ends to be heat-sealed of a gusset folding portion and a center seal portion, and there are steps at the boundary. A cross section of a gusset bag is illustrated in FIG. 2. As shown in the figure, the gusset bag has gusset folding portions on both sides and a center seal portion at the center in the lengthwise direction by sealing areas faced towards each other. These portions are piles of 4 sheets, and the areas therebetween are piles of 2 sheets, and therefore, the boundary shown by a black band in FIG. 2 is a step portion. In this figure, the top of the right side gusset folding portion becomes uneven, and there is also a step portion. The inventor found that when a bag having such a step is heat-sealed by peelable seal, leaks are generated at the step portion, and this problem was solved by the development of a new heat seal structure where a linear peelable seal is added to a bond-shaped peelable seal in the longitudinal direction (Patent Document 1).

Figure 3:
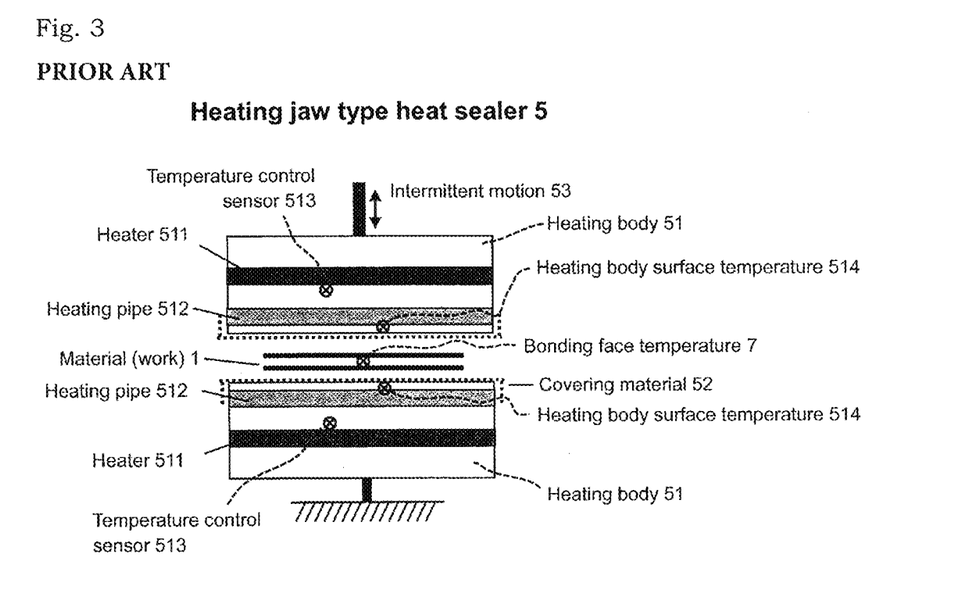
[FIG. 3] is a side sectional view showing a state of conducting heat seal by the heating jaw system.

The conventional heat-sealing method is an intermittent heating method using a heating jaw. In this method, heat sealing is conducted by putting a material to be heat-sealed between a pair of heating bodies, and moving one or both heating bodies. An apparatus using therefor is schematically illustrated in FIG. 3. In the apparatus, heating bodies 51, 51 are faced each other, and in each heating body, a heater 511 is embedded inside, and a heating pipe 512 is further embedded in the vicinity of heating surface. Every heating body 51, 51 is provided with a temperature control sensor 513 in the vicinity of the heater 511, and in the case of applying Patent Document 5, a sensor measuring the surface temperature of the heating body 514 is attached to the heat-sealing surface. Moreover, the heat-sealing surface is covered with a covering material 52. A heat seal material (work) 1 is placed on one of the heating bodies 51, and heat-sealing is conducted by descending the other heating body 51 to press the heat seal material 1.

Prior to starting the operation, welding face temperature 7 is measured by inserting a minute sensor between the heat seal materials 1, and employing the surface temperature of the heating body to be in contact with the material as a parameter. By the inspection, welding face temperature can be grasped exactly while operating by the management of the surface temperature of the heating body (Patent Document 2). After heat-sealing, the heating body 51 is elevated to take out the heat seal material 1, and the intermittent motion 53 is repeated. In the method of adding the linear seal, a linear rib is formed on the heat-sealing surface of one heating body 51, and a heat-resistant elastic body 3-5 mm in thickness (not illustrated) is mounted on the surface of the other heating body 51. In this case, a covering material is not mounted.

Figure 4:
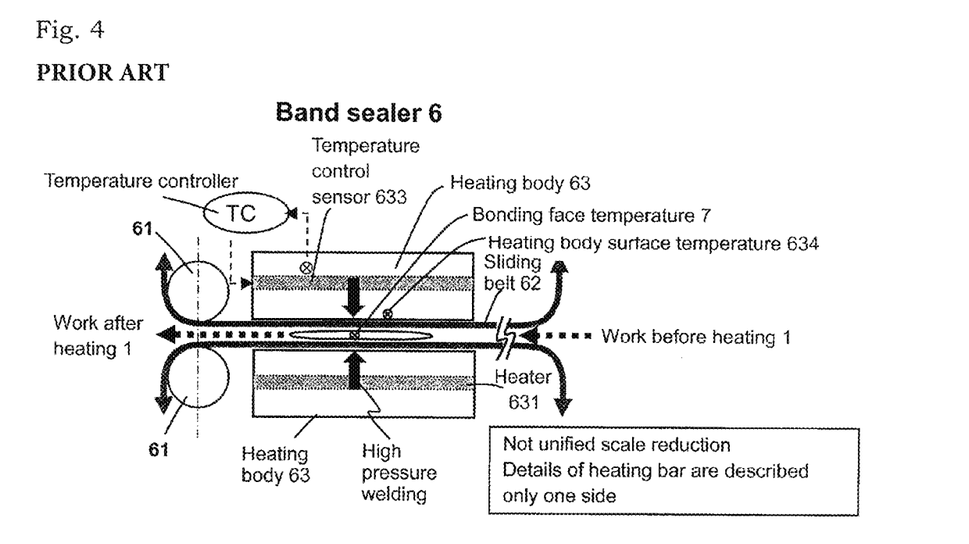
[FIG. 4] is a side sectional view showing a state of conducting heat seal by the band sealer.

As the heat-sealing method, there is a method of continuous heating type using a belt. In this method, a heat seal material is nipped by a pair of belts to convey it, and during conveying, heat-sealing is carried out by the heat supplied by the heating bodies in contact with the belt. The apparatus applied to this method is called band sealer, and an example is illustrated schematically in FIG. 4. This apparatus is composed of a pair of sliding belts 62 faced each other and heating bodies 63 in contact therewith. A heater 631 is embedded in each heating body 63, and a temperature control sensor 633 is mounted in the vicinity thereof, and a sensor which measures the surface temperature 634 of the heating body is attached to the surface of the heating body 63 in contact with the sliding belt 62. When a heat seal material 1 is inserted from the entrance of the sliding belts 62 to convey it, it is heat-sealed during passing the heating body 63 area, and discharged from the exit of the belts 62.

(1) Characteristics of Intermittent Type Heating

1) The maximum heat seal length of packaging product is limited by the length of heating bar.

2) Necessary pressing force to be added is in proportion to heat seal area.

3) Bonding area is fixed to ensure press bonding while heating.

4) Heating proceeds simultaneously in parallel in the whole width to be heat-sealed.

5) Temperature unevenness of the heating body affects heating surface as it is.

6) Processing inherent in bonding face can be added.

7) Heating efficiency is high caused by direct contact of the material with heating body.

1), 2), 5) are demerits of the intermittent type heating.

3), 4), 6), 7) are merits of the intermittent type heating.

(2) Characteristics of Continuous Type Heating

1) Heating can be conducted without limitation on heat seal length of a packaging bag.
2) Every heat seal portion is heated uniformly, because whole heating surface passes with sliding.
3) Heating efficiency is low, because heating is performed through sliding of conveying belt or with a space.
4) To conduct a high pressure press bonding with heating is not easy.
5) It is difficult to add an inherent processing to bonding face.
6) It is difficult to apply a metal belt due to a great frictional resistance to a heating body.
1), 2) are big merits of the continuous type heating.
3), 4), 5), 6) are demerits of the continuous type heating.

DOCUMENTS

Patent Documents

Patent Document 1: JP 5779291
Patent Document 2: JP 3465741
Patent Document 3: JP 6032450
Patent Document 4: JP 3811145
Patent Document 4: JP 4623662

SUMMARY

Problems to be Solved

As the heat-sealing method, the heating jaw system which is a representative technique of the intermittent type heating, heat seals a work being the heat seal material in the stopped state, and possesses many desired functions of heat seal. Therefore, it is frequently used in the industry as a standard. Whereas, the continuous type heating has merits of no limitation to the heat seal length, to be excellent in uniform heating, etc. In the band sealer, although it was considered to employ a metal belt having a high heat conductivity, there is a problem of a great frictional resistance to the heating body resulting in that the belt tends to be damaged and that the heating body is also scraped. Then, a glass-wool woven fabric impregnated with polytetrafluoroethylene (Teflon, tradename) is commonly used as the belt material.

Figure 5:
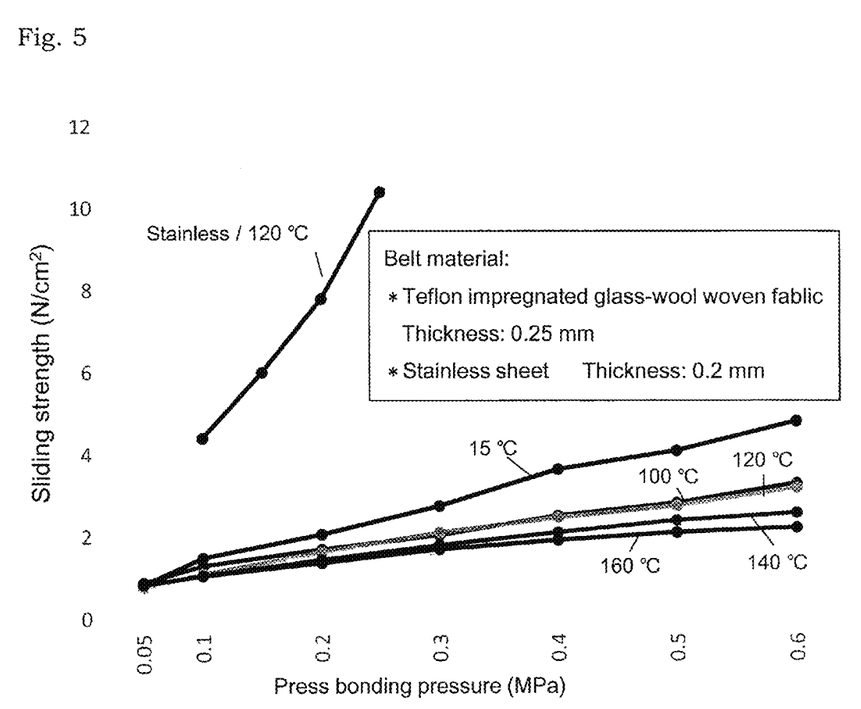
[FIG. 5] is a graph showing a relationship between press bonding pressure and sliding strength (frictional force) obtained by using a glass-wool woven fabric impregnated with polytetrafluoroethylene or a stainless steel sheet as the belt material and varying heating body temperature.

Using a heating body made of brass and a belt made of a glass-wool woven fabric impregnated with polytetrafluoroethylene 0.25 mm in thickness or made of stainless steel 0.2 mm in thickness, sliding strength (frictional force) was measured varying the press bonding pressure of the belt by the heating body from 0.05 MPa to 0.6 MPa and the surface temperature of the heating body from 15° C. to 160° C., and the results are shown in FIG. 5. As shown in the figure, in the case of using the belt treated with polytetrafluoroethylene which are used for the band sealers generally;
(1) Sliding strength under room temperature conditions is found to be greater than it under heated conditions.
(2) Sliding strength increases proportionally with the increase of press bonding pressure.
(3) When heating temperature is raised, it can be seen that the sliding strength (become slippery) tends to decrease. The strength indication is per cm², and the total sliding strength is a value obtained by multiplying the contact area with a heating bar.

When it is set: heat seal width: 15 mm, heating bar length: 200 mm, 300 mm, press bonding pressure: 0.3 MPa, heating body surface temperature: 120° C., from the sliding strength per 1 cm² of 2 N/cm², the total sliding strength is:

$$\text{In the case of 200 mm; } (1.5 \text{ cm} \times 20 \text{ cm} \times 2 \text{ N/cm}^2) = 60 \text{ N}$$

$$\text{In the case of 300 mm; } (1.5 \text{ cm} \times 30 \text{ cm} \times 2 \text{ N/cm}^2) = 90 \text{ N} \quad \text{[Mathematical 1]}$$

In practice, this load is the total load which is applied to the belt in the apparatus, and becomes tensile strength of the belt. Namely, since this load corresponds to belt tension, when heating bar is lengthened, the burden on the belt increases proportionally. This characteristics restricts selection of a longer heating bar (heating body), and impedes stability of heating. Furthermore, due to the great tensile force, it is a common problem of band sealers to generate damages to the surfaces of belt and heating body.

The results of measuring sliding strength of metal belt (stainless steel), of which the employment is avoided heretofore, are also shown in FIG. 5. It was confirmed by the measurement that the sliding strength of the metal sheet is about 5 times greater than the sheet impregnated with polytetrafluoroethylene, and it is difficult to apply a metal belt having a characteristic of great heat conductivity.

Although the methods of allowing a work directly to contact with a heating body or flowing hot air are also found occasionally, these methods have a problem of causing damages to the packaging bag. It was found that since conventional band sealers adhere bonding faces through a belt, there is a defect that the surface of heating body cannot be processed to add a single linear rib or to render elastic.

An object of the at least one embodiment of the present application is to provide a heat-sealing apparatus and method capable of forming efficiency a composite heat seal structure composed of a band-shaped peelable seal and a linear peelable seal added thereto in the longitudinal direction.

Means for Solving the Problems

The inventor investigated eagerly in order to solve the above problems, and designed to separate working areas by dividing the heating portion and the press bonding portion. Namely, a part of a softened work immediately after discharged from the belt conveying, heated portion is sealed through plastic deformation by a single linear rib formed in a pair of specially configured rolls (die roll). Simultaneously, the work is provided with area bonding utilizing fluidity deformation of elastic body. The inventor considered to apply a metal belt by the separation of working areas to weaken press bonding load in the belt conveying heating portion and to remove the defect by the frictional resistance in the heating portion. By the separation of the working area of heating and that of press bonding, sealing and easy openability equivalent to Patent Document 1 can be achieved in the continuous operation configuration (band sealing).

Figure 10:
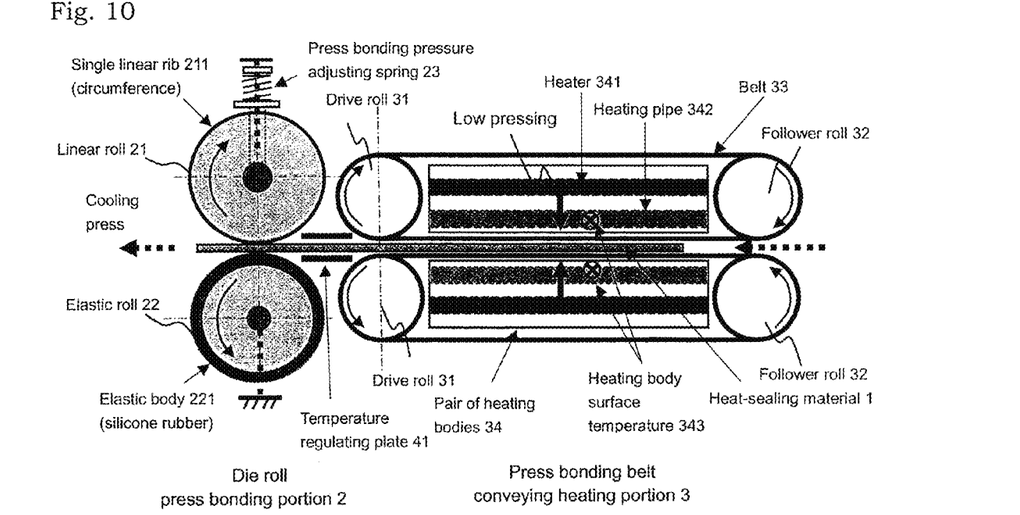
[FIG. 10] is a side sectional view illustrating schematically the heat-sealing apparatus of at least one embodiment of the present application.

The present application was made based on the above findings and techniques (See FIG. 10).

It provides a heat-sealing apparatus forming a composite heat seal structure, wherein:
(1) The belt conveying, heating and press bonding portion is composed of a pair of belts, each of which is engaged by rolls and travels therebetween, and a heating body which is located with a space from the belt.

(2) The die roll press bonding portion is composed of a roll (linear roll 21), wherein a linear rib is formed on the peripheral surface in the circumferential direction, and an elastic roll 22.

(3) The composite heat seal structure is composed of a band-shaped peelable seal and a linear peelable seal added thereto in the longitudinal direction.

And, it provides a method of heat-sealing to form a composite heat seal structure, wherein:

(4) A heat-sealing material is nipped by a pair of belts to convey it, while the heat-sealing material is heated to form a band-shaped peelable seal.

(5) Subsequently, the band-shaped peelable seal is passed between a roll (linear roll 21), wherein a linear rib is formed on the peripheral surface in the circumferential direction, and an elastic roll 22 to form a linear peelable seal on the band-shaped heat seal, and the band-shaped heat seal is further heat-sealed as peelable seal.

Effects of At Least One Embodiment

Effects of the at least one embodiment are enumerated below.

1) In a bag having a step portion, such as pillow bag or gusset bag, "seal" at the step portion and "easy opening" can be achieved by using the band sealer provided with the die roll by applying a combination of a linear seal and a band seal.

2) A long life of the sliding belt can be achieved by rendering the press bonding pressure of the belt of the band sealer to minimum.

3) The heating body can be lengthened easily to improve productivity caused by raising heat bonding speed of the band sealer.

4) Limitations of the packaging material to be applied and of packaging form are reduced.

5) A metal belt can be employed.

6) Heat seal validation performance (reasonable "seal" and "easy opening" are possible) of the band sealer is sharply raised.

DETAILED DESCRIPTION OF EMBODIMENTS

Definition of Temperature Expression Utilized in This Description

First, temperature expressions used in the detailed description of at least one embodiment are explained.

Heating temperature: A general term of the temperature heating a material to be heated; in heat-sealing technique, it is basically welding face temperature.

Controlled temperature: Controlled value to heat a heating body at a constant temperature.

Heating body: Metal block having a heat source and controlled to a prescribed temperature.

Heating body surface temperature: Surface temperatures of a heating body are different by the heat transfer from a heating element (heater) and the heat dissipation to periphery, and temperatures of respective heating surfaces are not identical.

Temperature of heating surface to be in contact with the material to be heated is defined as "heating body surface temperature".

Welding face temperature: Reached temperature of heat bonding face of a packaging material.

Welding face temperature response: Variation response of the temperature of heat bonding face of a packaging material.

Heating speed: Variation speed of welding face temperature (° C./s).

Equilibrium temperature: Temperature where welding face temperature response constricts/reaches (about 3 times CUT or more).

Come up time (CUT): Time of 95% response of equilibrium temperature (s).

Interfacial bonding temperature zone: Heating zone where bonding faces are peeled by peeling force.

Agglomerate bonding temperature zone: Heating zone where sealant is melted to integrate (molded) 2 surfaces of the sealant.

Bonding temperature zone: Connecting region of the temperature zone where interfacial bonding appears and the temperature zone where agglomerate bonding appears, in heat bonding characteristics.

Both sides heating: Temperature control function is added to a pair of respective heating bodies. Usually, set at the same temperature.

One side heating: One of heating surfaces is allowed to depend on environmental conditions without particular temperature control.

The at least one embodiment is applied fundamentally to the heat seal upon making/sealing packaging bags, and representative bag forms are the following four bags.

(1) 4-sided fin seal bag made by doubling sheets in flat and sealing four sides.

(2) 3-sided fin seal bag made by folding a sheet and sealing three sides.

(3) Pillow type bag made by folding a sheet to face seal areas each other, locating the seal areas around the center of rear side of the packaged product, to render so that only 2 places, i.e. upside and underside, of seal areas can be seen from the front side of the product.

(4) Envelope type bag made by changing the seal portion facing each other in the pillow type bag to envelope type seal where two sheets are superimposed.

The pillow type bag is a modification of the three-sided fin seal bag. First, using a molding tool, the facing line is located around the center of the back of the bag and sealed to form center seal (sealed with facing each other). Thereafter, the upside and underside portions are sealed including folded newly formed center seal portion (fin), and cut.

It is widely utilized because of changing easily from planar form to steric form.

When gussets in 2 lines are formed on both sides of pillow type bag, it becomes gusset bag. Since the gusset bag is possible to be a stereo bag, it has characteristics of good appearance of commercial goods and good efficiency for charging them. Whereas, by rendering gusset bag, problems similar to pillow type bag occur and increase.

Since pillow type packaging bag is excellent in automating ability, it is frequently utilized for soft packaging centering in the field of foods. Moreover, the fin of the center seal exhibits a convenience to exhibit a function of tab upon opening.

The envelope type bag is formed by changing the center seal portion sealed with facing each other of the pillow type bag to 2 sheets piled portion. It is characterized by small step at sealed area and no fin formed by facing seal.

However, it is necessary to provide a sealant having bonding ability on both sides of the material to increase cost, and therefore, its use are restricted.

Film and sheet, which are heat seal materials, are enough to have a heat-sealable layer, and may be formed of single layer or plural layers. In general, it is polyethylene, polypropylene, ethylene copolymers or the like. In addition, not crystallized polyethylene terephthalate and the like are also usable. The thickness of the heat-sealable layer is usually about 3-200 µm, typically about 5-150 µm without limiting specifically thereto. When referring to experimental results, the thickness of the heat-sealable layer to be applied to at least one embodiment is necessary to be 10 µm or more in order to compensate the step portion.

The film or sheet composed of plural layers is constructed by laminating two types or more materials in order to improve printability, resistance to breakage, or gas barrier ability, to adjust rigidity of bags, to prevent adhesion of the material in softened state to the heating plate, or the like. At least, an adhesive layer (sealant) which is the heat-sealable layer, is allocated to one of the surface layers. Heretofore, the design is evaluated "good" to render a great difference in the temperature region applied to the material of the surface layer which becomes the outside layer, and the adhesive layer, and low-temperature solidifying materials were applied.

This selection is convenient for planar bonding. However, it is not noticed to the fault in design that softening of the surface layer material having flexural stiffness is insufficient in the proper heating temperature range of the adhesive layer to result in an obstacle factor (generation of a through holes) of sealing in a seal containing a flexed portion (Patent Document 3).

The thickness of the film or sheet composed of plural layers is usually about 2-200 µm, typically about 20-120 µm, without limiting specifically thereto.

The heat seal width of the bags may be usual, in general about 3-20 mm, typically about 5-15 mm. The heat seal width may be identical at all heat seal areas, or may be different, for example, between the upside seal portion and the center seal portion.

The composite heat seal structure of at least one embodiment comprises a band-shaped peelable heat seal wherein a peelable seal is provided in band-shaped, and a linear peelable heat seal located therein in the longitudinal direction.

The band-shaped peelable heat seal is provided, in the case of packaging bag, on a side to be opened, and the width is in general about 3-30 mm, typically about 5-15 mm. A preferred bonding strength (heat seal strength) which is a peelable strength, is usually about 2-12 N/15 mm, generally about 2-10 N/15 mm. By setting the bonding strength in this range, the strength can address individual uses having a restriction, such as to be easy to open or to be difficult to open by children The resistance to bag rupture at the linear seal portion is small because of a minute width (line). When a bag rupture stress is applied to the heat seal edge on the inside of the bag, according to Patent Document 4, the stress is consumed by the peel energy during peeling the band-shaped peelable seal to protect the bag from rupture. The band-shaped peelable heat seal portion is configured exclusively as the place to generate peel energy, and the band-shaped peelable seal is not necessarily required to be complete seal (see FIG. 13).

The width and the depth of the linear seal formed by the linear rib of die roll fundamentally agrees with the width and the height of the linear rib. The width of the linear seal is about 0.05-2 mm, preferably about 0.1-1.5 mm, and the depth is about 0.05-2 mm, preferably 0.1-0.8 mm.

The linear seal portion is enough to achieve sealing, and a suitable adhesive strength is about 2-15 N/15 mm, preferably about 2-12 N/15 mm.

The linear seal is provided in the band-shaped peelable heat seal in its longitudinal direction, and it is preferred to be located not at the center of the band-shaped peelable heat seal but on the side of the outer edge, for example, preferably in the range of about 60-90%, preferably about 60-80% of the total width from the inner edge with keeping at least 5 mm. (Patent Document 4)

The number of the linear seals is basically one, but it is possible to provide plurality, such as two lines or three lines, with increasing local press load, within the range where the function and effects of at least one embodiment is not harmed.

In the case that the heat seal area is curved, it is preferred that the curve pattern of the single linear rib is synchronized with the entry of work, and the linear seal is provided along the curve.

The heat-sealing apparatus of at least one embodiment is to form the composite heat seal structure as above, and comprises a belt conveying, heating and press bonding portion and a die roll press bonding portion.

The belt conveying, heating and press bonding portion is an area to heat a heat-sealing material so as to form the composite heat seal having a predetermined heat seal strength at the next die roll press bonding portion, and is composed of a pair of belts, each of which is engaged by rolls and travels therebetween, and a heating body which is located with a space from the belt.

The number of rolls is basically 2 per each belt, accordingly, the total number is 4. The rolls on the side of entrance of the heat seal material are preferably disposed slightly apart from each other so as to facilitate entering the heat seal material. Whereas, in the area where the heat seal material passes through the heating body portion, the space between both belts is made smaller than the thickness of the heat seal material so as to apply press bonding pressure between the belts.

For that purpose, guide rolls to regulate the space on the entrance side of the heat seal material can be provided on the entrance side to the heating body. Guide rolls can be further provided on the exit side. Usually, one of the rolls engaging the belt is a drive roll, and the other is a follower roll.

The drive roll is provided with a rotation speed control mechanism so as to change traveling speed. Moreover, one or both rolls are made movable in the direction perpendicular to the traveling direction to control the space between the rolls so as to change the press bonding pressure applied to the heat seal material. In the case of providing the guide rolls, it is also to control the space between the guide rolls.

The belt may be conventional, such as polytetrafluoroethylene impregnated glass-wool woven fabric, but that made of metal is preferred in order to raise thermal efficiency.

Figure 6:
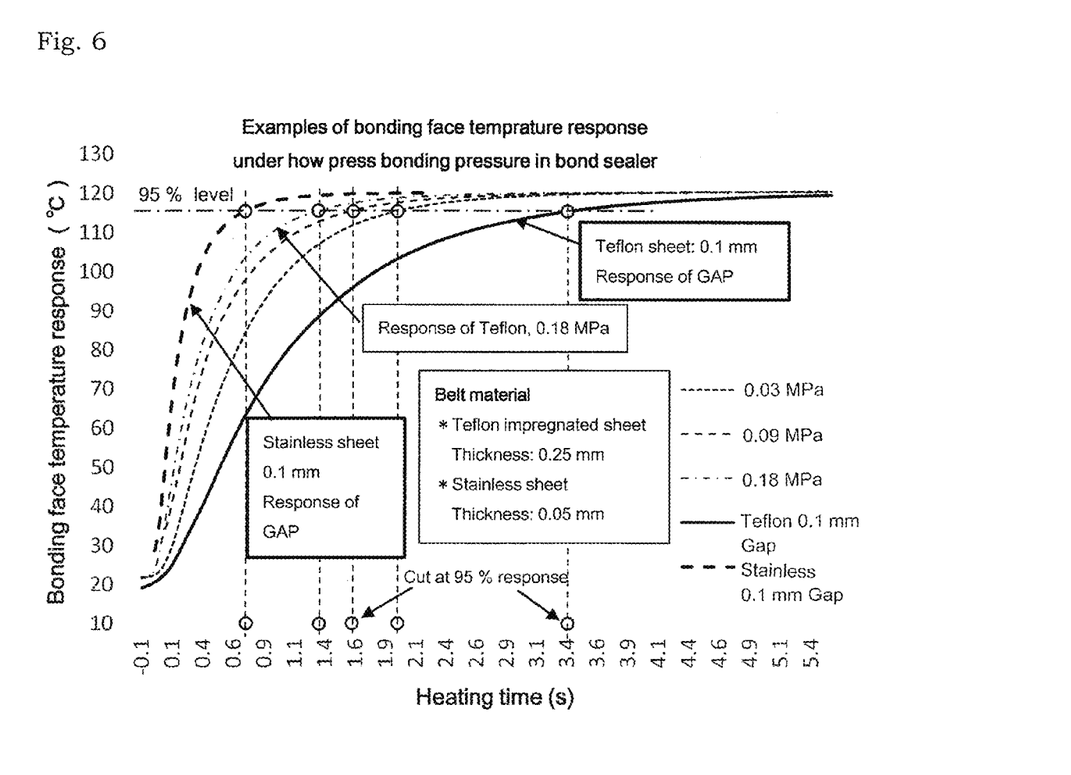
[FIG. 6] is a graph showing a relationship between heating time and welding face temperature response obtained by using a glass-wool woven fabric impregnated with polytetrafluoroethylene or a stainless steel sheet as the belt material and varying press bonding pressure.

This was demonstrated by measuring a response of welding face temperature with a gap of 0.1 mm using a polytetrafluoroethylene impregnated glass-wool woven fabric 0.25 mm in thickness as a representative conventional belt and a stainless steel sheet 0.04 mm in thickness as a representative metal belt. The press bonding pressure was varied at 0.03 MPa, 0.09 MPa, 0.18 MPa, and the response was measured by applying the MTMS kit (JP 3465741). The results are shown in FIG. 6.

As shown in the figure, it can be seen that the response of polytetrafluoroethylene with a gap of 0.1 mm (not in contact) is considerably slower than the other measured results. In the press bonding pressure from 0.03 MPa to 0.09 MPa, the responses of welding face temperature are faster. As far as heating response, high press bonding pressure is effective.

When the effect of the press bonding pressure raising the heating response is reviewed by the sliding frictional force which is another parameter, as shown in FIG. 5, it can be seen that there is a great problem with increasing the press bonding pressure.

The come up time (CUT) of the non-contact welding face temperature response of stainless steel sheet 0.04 mm applicable to the belt material is demonstrated to be about 0.7 second, and it is much faster than the response of polytetrafluoroethylene impregnated sheet 0.25 mm at a press bonding pressure of 0.18 MPa. Since the frictional force of stainless steel sheet is very great under pressing, there is a problem with practicability is its use. However, under non-contact conditions, in frictional force is zero, and therefore, the problem of the metal belt is solved. As a whole, the superiority of the belt made of metal, represented by stainless sheet was confirmed.

The belt made of metal is formed by a high heat-conductive material which is resistant to rusting under heating at about 200° C., such as stainless steel, aluminum or brass, and the thickness is about 0.01 to 0.2 mm. The width is the same as the heat seal width or slightly wider than it. Since the heat seal width is usually about 5-20 mm, a suitable belt width is about 5-25 mm. As to the surface, both surfaces are smooth.

The heating body is to heat the heat seal material through the belt, and commonly formed of a heat-conductive material resistant to rusting under heating at about 250° C., such as stainless steel, aluminum or brass. As the heat source of the heating body, an electric heater is commonly used, and is set on the inside of the heating body.

The heating surface of the heating body is made in a form of long rectangle, and the length is set so that necessary heating can be achieved. The width is, in general, made greater than the heat seal width by about 5-10 mm.

The heating body is located with a space from the belt, in order to prevent it from damaging by the sliding of belt. The space is set to render the press bonding pressure between the belt and the heating body 0.02 MPa or less, preferably 0.01 MPa or less. When the space is too great, heat efficiency is degraded. Therefore, the upper limit of the space is about 0.2 mm, preferably about 0.1 mm. For that purpose, it is preferably to provide a mechanism of moving the heating body to adjust the space from the belt.

The die roll press bonding portion is an area to form the composite heat seal structure by press bonding the heat seal material of which the prescribed portion has been heated in the belt conveying, heating and press bonding portion, and is composed of a linear roll and an elastic roll.

The linear roll is a rigid roll made of a metal, such as stainless steel or brass, or a ceramic, coated with polytetrafluoroethylene, DLC or the like.

The diameter is about 40 to 100 mm, and the width of the surface to be in contact with the elastic roll is identical with the width the band-shaped peelable seal. The height and width of the linear rib are allowed to agree with the linear seal to be formed.

Although the linear roll may be provided with a heating mechanism, it is not so effective because the time in contact with heat seal material is shorter than the heat response of the material. To raise temperature by the heat inertia caused by continuous operation is in a preferred direction.

The elastic roll may be made of an elastic body as a whole, or may be a common roll of which the peripheral surface is covered with an elastic body sheet. The material of the elastic body may be any one having a necessary elasticity and resistance to heat-sealing temperature, and for example, silicone rubber can be employed. Preferred one has a thickness of about 3-5 mm and a hardness of about A 50-A 80.

The diameter of the elastic roll is in general about 40-100 mm which is decided by considering the consumption of the elastic body during continuous operation. The width is preferably set so as to form margins of 2 mm or more on both sides where the linear roll does not press.

At least, one of the linear roll or the elastic roll has a structure capable of moving freely in the vertical direction under a necessary load so that they accommodate the total variation of the thickness of heat seal material and deformation of the elastic roll by compression. Moreover, they are arranged to adjust the press bonding pressure to a prescribed value.

Both of the linear roll and the elastic roll are driven at the same number of revolutions so as to be conformed to the traveling speed of the heat seal material conveyed from the belt conveying, heating and press bonding portion.

It needs that the peripheral speed of the die roll is exactly matched with the speed of the conveying belt, and therefore, the same driving source is used of the belt and the die roll, or the number of revolution is electrically controlled.

Incidentally, the inventor found that temperature of the heat seal material descends between the belt conveying, heating and press bonding portion and the die roll press bonding portion, and this is possible to become a problem upon heat-sealing. Namely, the heat seal material is transferred from the belt conveying, heating and press bonding portion to the die roll press bonding portion through a space.

The heating conditions are different according to heat seal material, temperature and length of heating body, and conveying speed.

TABLE 1

| Roll diameter (mm) | Temp. keeping space (mm) | Belt speed (m/min) [In frame is transit time of temp. keeping space (s)] | | | | | | | | | |
|---|---|---|---|---|---|---|---|---|---|---|---|
| | | 1 | 2 | 3 | 4 | 5 | 6 | 7 | 8 | 9 | 10 |
| 20 | 40 | 2.4 | 1.2 | 0.8 | 0.6 | 0.48 | 0.4 | 0.34 | 0.30 | 0.27 | 0.24 |
| 30 | 60 | 3.6 | 1.8 | 1.2 | 0.9 | 0.72 | 0.6 | 0.51 | 0.45 | 0.41 | 0.36 |
| 40 | 80 | 4.8 | 2.4 | 1.6 | 1.2 | 0.96 | 0.8 | 0.68 | 0.60 | 0.54 | 0.48 |
| 50 | 100 | 6.0 | 3.0 | 2.0 | 1.5 | 1.20 | 1.0 | 0.85 | 0.75 | 0.68 | 0.60 |
| 60 | 120 | 7.2 | 3.6 | 2.4 | 1.8 | 1.44 | 1.2 | 1.02 | 0.90 | 0.81 | 0.72 |
| 70 | 140 | 8.4 | 4.2 | 2.8 | 2.1 | 0.81 | 1.4 | 1.19 | 1.05 | 0.95 | 0.84 |
| 80 | 160 | 9.6 | 4.8 | 3.2 | 2.4 | 1.92 | 1.6 | 1.36 | 1.20 | 1.08 | 0.96 |
| 90 | 180 | 10.8 | 5.4 | 3.6 | 2.7 | 2.16 | 1.8 | 1.53 | 1.35 | 1.22 | 1.08 |
| 100 | 200 | 12.0 | 6.0 | 4.0 | 3.0 | 2.40 | 2.0 | 1.70 | 1.50 | 1.35 | 1.20 |

Figure 7:
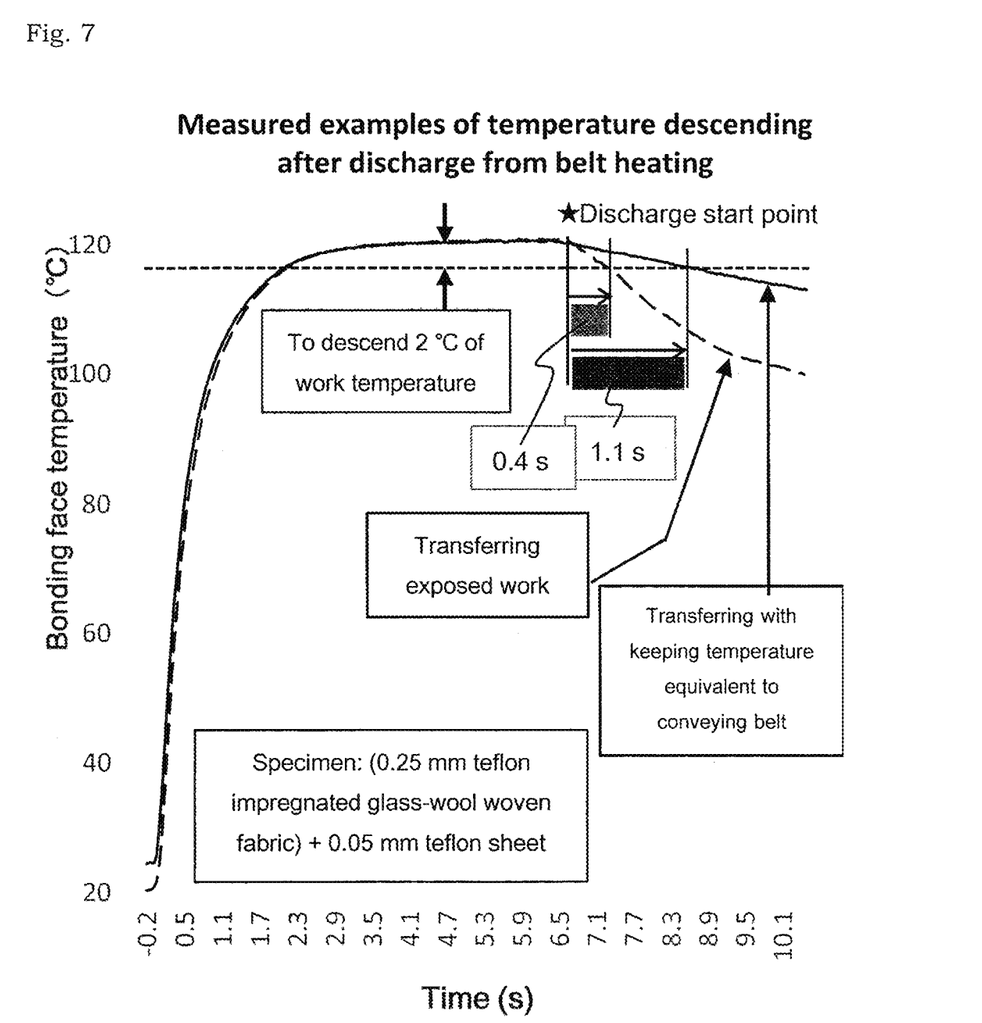
[FIG. 7] is a graph showing temperature descending after discharge from belt heating.

The temperature lowering of the heat seal material therebetween was measured, and the results are shown in FIG. 7.

In order to achieve the anticipated seal surely, it is necessary to restrain the temperature lowering within 2° C. than the set value of the welding face temperature at the heating portion. The temperature lowering was 0.4 s/2° C. in the exposed state at room temperature, and was 1.1 s/2° C. in the case of keeping the temperature at the temperature of the belt. Thus, it was found that the heat-sealing of at least one embodiment can be ensured by the protection to keep the temperature. (see FIG. 7)

The discharge speed of heat seal material varies according to the prescribed conditions of heating at the belt conveying, heating and press bonding portion. The relationship between the diameter of the die roll and the transit time of transfer dimension (the length of temperature keeping space) from the drive roll 31 was pursued by trial calculation, and the results are shown in Table 1. The transit time is investigated in the case of the die roll diameter 50 mmφ.

The transit time is 0.6 s for the belt speed 10 m/min, 1.0 s for 6 m/min and 1.6 s for 5 m/min. It was found that, in every case, the welding face temperature response is beyond the proper range by the transfer in exposed state, and therefore, it is difficult to complete bonding by the separated die roll. Using the belt speed of 1.0 s as a criterion, combinations of belt speed and roll diameter are divided by a bold line in Table 1. In the application range of belt speed and roll diameter which are commonly used, active temperature keeping having a heating function is required.

Temperature keeping plates which were connected to a heat source were provided. The gap between each temperature keeping plate and heat seal material was made 2-5 mm so as not to restrain the transfer of the heat seal material. The heating by the temperature keeping plates is enough to be set at a temperature higher than the welding face temperature at the belt conveying, heating and press bonding portion by about 5° C. and precise temperature control is not required.

By the construction of the temperature keeping plate, the single linear seal and planar press bonding can be ensured even under low speed operation conditions.

The heat-sealing with the composite structure using such an apparatus is conducted by heating the heat seal material to be rendered at a proper temperature in the belt conveying, heating and press bonding portion, and by pressing it to be rendered at a proper press bonding in the die roll press bonding portion.

Referring to the response of welding face temperature of the heat seal material, the combination of the length of heating body and belt speed is selected to decide heating time by the following formula:

Provided that •Length of heating body: L (m), •Conveying speed of belt: V (m/s), •Necessary heating time: t (s) (measured by utilizing "MTMS" kit)

[Mathematical 2]

$$t = L/N \ (s) \tag{1}$$

It is necessary that this time is longer that the response time set from the integrated welding face temperature response of the belt material and the heat seal material.

If the heat transfer (heating during sliding) between heating body and belt is carried out equivalent to the heating jaw system, the heating mechanism of the band sealer can be developed equivalent to the theory of the heating jaw system.

Figure 8:
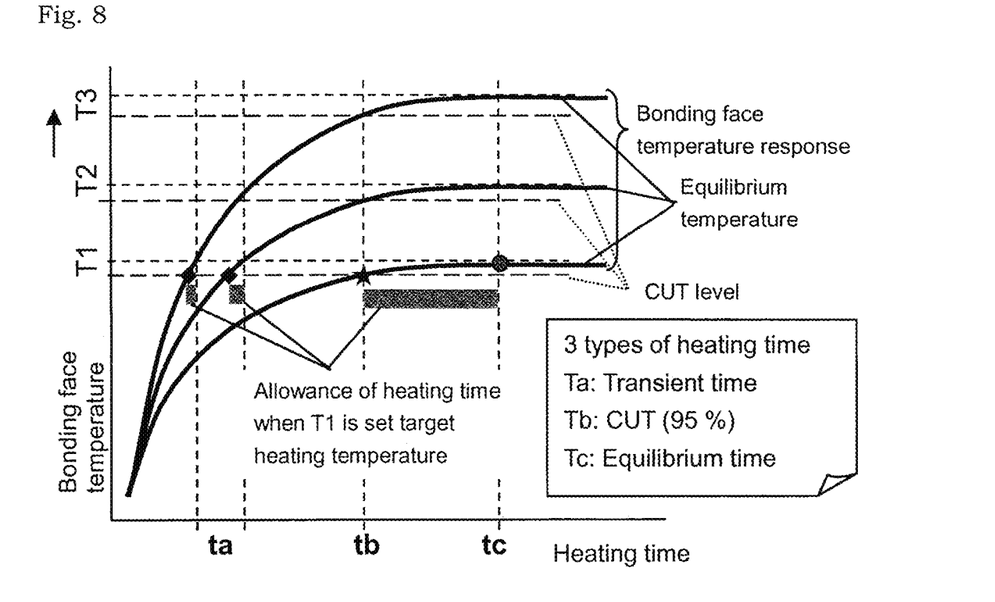
[FIG. 8] is a graph illustrating schematically variation of welding face temperature with heating time.

The response of welding face temperature can be measured by using the surface temperature of heating body as a parameter. The model is shown in FIG. 8.

The response of welding face temperature becomes finally asymptotic. But, it becomes an asymptotic line at the arrival point, and it is actually difficult to define the response.

Then, the inventor defines CUT (Come Up Time) by employing 95% arrival time.

Provided that •Arrival temperature of welding face temperature response (equilibrium temperature); Te, •Start temperature (room temperature); Tr,

[Mathematical 3]

$$T_{95} = (Te - Tr) \times 0.95 + Tr \tag{2}$$

The time to arrive at $T_{95}$ is read from the data of welding surface temperature response obtained by using "MTMS" kit to get the CUT value.

In the case of Tr; 20° C., Te; 120° C., 150° C., $T_{95}$ is calculated to obtain 115° C., 143.5° C. The difference between the CUT are the equilibrium temperature is 5° C., 6.5° C.

In the case of practicing heat bonding (heat-sealing), referring to the response characteristics like FIG. 8, T1 selected which is near the target temperature and slightly higher (2-3° C.) than it, as the heating body surface temperature. Alternatively, a much higher temperature, such as T2 or T3 is employed, and the heating temperature is set by the time control at the time of passing T1.

If the welding face temperature is selected around T1, it is characterized by a great allowance time against the necessary welding face temperature. Whereas, by the heating at a transient temperature on the high temperature side, the heating time is short, but the range of proper time becomes very narrow. Therefore, it requires a high degree time control, and has a defect that the finish is unstable.

The heating time of one work is determined by the integration of three points, i.e. the length of heating body, belt speed and heat transfer response properties between sliding belt and work. The heating times determined by the relationship between the length of heating body and belt speed are shown in Table 2.

Each passing (heating) time shown here decides the design conditions and operation conditions compared with the heat transfer response of belt and heat seal material described as above.

Since the length of heating body is decided upon its manufacture, it cannot be selected in operation.

In the case of the heating body having a length of 200 mm, when polytetrafluoroethylene belt 0.25 mm in thickness is used, and heating time of 3.0 s can be ensured by adjusting the press bonding pressure minor, the fastest belt speed (upper limit of the speed) is 4 m/min. The speed up more than this falls in transient heating conditions where heating conditions become unstable.

TABLE 2

Table of passing (heating) times decided by heating body length and belt speed

| Heating body length (mm) | Table of passing (heating) time (s) Belt speed (m/min.) | | | | | | | |
|---|---|---|---|---|---|---|---|---|
| | 1 | 2 | 3 | 4 | 5 | 6 | 7 | 8 |
| 100 | 6.0 | 3.0 | 2.0 | 1.5 | 1.2 | 1.0 | 0.85 | 0.75 |
| 200 | 12.0 | 6.0 | 4.0 | 3.0 | 2.4 | 2.0 | 1.7 | 1.5 |
| 300 | 18.0 | 9.0 | 6.0 | 4.5 | 3.6 | 3.0 | 2.6 | 2.3 |
| 400 | 24.0 | 12.0 | 8.0 | 6.0 | 4.8 | 4.0 | 3.4 | 3.0 |

In the case of non-contact stainless steel sheet system, since 1 s of the heating time can be applied, the speed of the belt can be extended to 6 m/min for the length of heating body of 100 mm. For 200-400 mm, speed up to 8 m/min or more is possible.

Thus, it could be proved the superiority of the non-contact system of sliding belt by the separation of heating and press bonding functions of at least one embodiment. Even in a low speed range, there is no problem if a countermeasure against temperature lowering of heat seal material is provided, such as by mounting a temperature keeping plate 41.

Moreover, the press bonding pressure at the die roll press bonding portion is also different according to the heat seal material and heating temperature (softening properties).

The sealing at a flexed portion by plastic deformation varies according to each material. The sealing stress at the flexed portion is measured by the test developed by the inventor, shown in FIG. 9.

Figure 9:
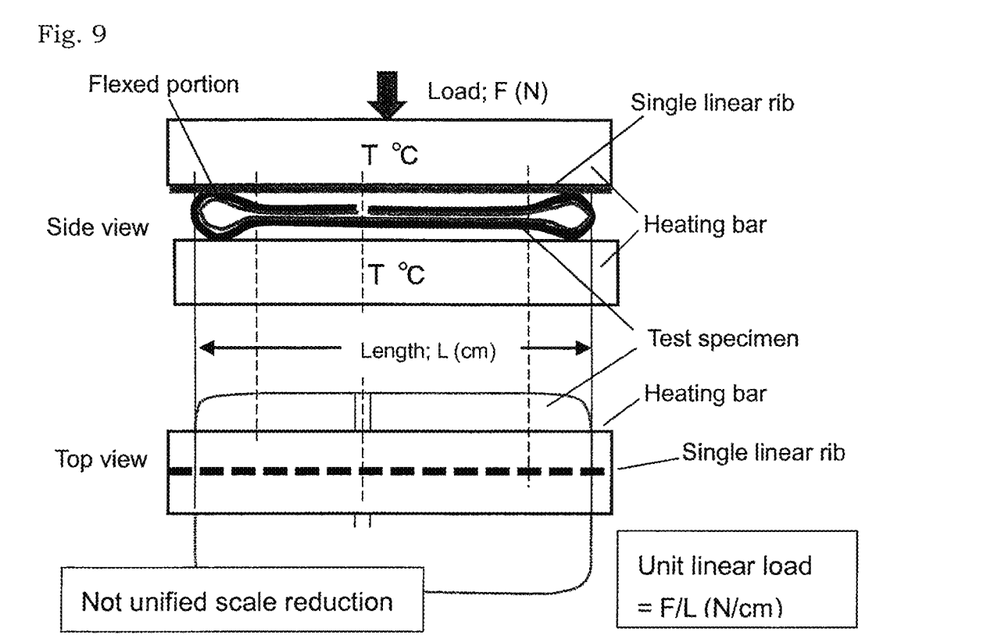
[FIG. 9] is a side sectional view illustrating schematically the test method of sealability at flexed portions.

The temperature T° C. of a heating bar provided with a single linear rib in a form of a half circle 0.5 mm in height is raised gradually, and pressing strength is changed. Thus, a combination of the temperature and press bonding pressure capable sealing is investigated.

The measured results are converted to linear load per 1 cm of single linear rib of the heating bar to seek standardization of the measured results.

A specimen is folded back to construct two flexed portions, and a LLDPE film about 10 μm in thickness is put therebetween in contact with the specimen. The specimen is heated to the surface temperature of T° C., and pressing load is changed. A flaw detecting solution is dripped to the flexed portion of the finished specimen, and the sealability is inspected visually using a loupe or microscope, according the evaluation technique developed by the inventor.

The test was conducted using OPP (biaxially stretched polypropylene having Young's modulus of about 2,000) which is the hardest and most difficult to seal among the packaging materials supplied on the market, and the results are summarized in Table 3.

Application Example of Patent Document 3

TABLE 3

Qualification test of sealability at flexed portion of highly rigid material (example)

| | Heating temperature (band surface temp.) [° C.] | | | | | | | |
|---|---|---|---|---|---|---|---|---|
| | 110 | 114 | 116 | 118 | 120 | 126 | 134 | 140— |
| Established strength of seal (N/cm) | 120 | 83 | 42 | 42 | 31 | 31 | 26 | Generation of shrinkage inapplicable due to melted state |
| | Rupture | Softening begins | | Eligible range | | | | Shrinkage begins |

Specimen material: OPP; 40 μm + Material to detect seal: LLDPE; 15 μm

Linear load of 26-120 N/cm was applied at each heating temperature (surface temperature of heating body).

From the results, it was found that when a high pressing load was applied at 110° C. where softening does not occur, the press bonding portion is whitened and crumbled, and it is difficult to seal out of softening temperature range.

At 114° C. where softening begins, linear load of 83 N/cm was required.

Further raising the temperature, the linear load was lowered to 42 N/cm from 116° C., and sealing by practical load could be achieved. Since the material was biaxially stretched, shrinkage occurred at a temperature to close its melting point. Therefore, the upper limit of applicable temperature is around 140° C.

It was found that the applicable temperature range is from 116 to less than 140° C. only for the purpose of sealing.

Embodiments

Figure 11:
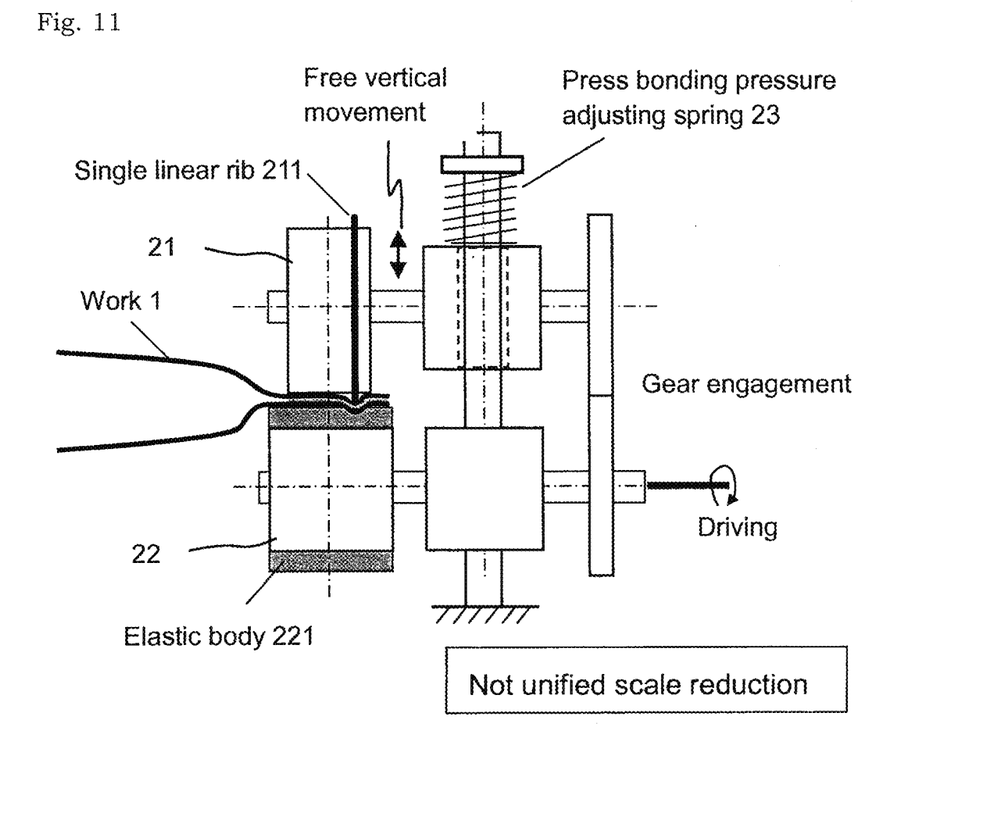
[FIG. 11] is a front view of the die roll press bonding portion thereof.

A side view of a schematic structure of a heat-sealing apparatus which is at least one embodiment of the present application is illustrated in FIG. 10, and a front view of the die roll press bonding portion thereof is illustrated in FIG. 11.

The belt conveying, heating and press bonding portion 3 is composed of a pair of belts 33 made of stainless steel 0.04 mm in thickness which is engaged between rolls 31, 32 and travels, and heating bodies 34 disposed with a space of 0.1 mm from the belt 33, respectively.

In the case of the heating body having a length of 200 mm, when polytetrafluoroethylene belt 0.25 mm in thickness is used, and heating time of 3.0 s can be ensured by adjusting to the minor press bonding pressure, the fastest belt speed (upper limit of the speed) is 4 m/min. The speeding up more than this falls in transient heating conditions where heating conditions become unstable.

Both of the rolls 31 on the left side in FIG. 10 are drive rolls and the rolls 32 on the right side are follower rolls. The drive rolls 31 and the follower rolls 32 facing each other respectively are rendered to adjust the space to vary the press bonding pressure applied on work 1. The drive rolls 31 are designed to change rotation speed to change traveling speed of work 1.

Both heating bodies 34 are in a form of rectangular parallelepiped having a length of 200 mm, and a heater 341 is embedded on the inside. A heating pipe 342 and a sensor 343 to measure surface temperature of the heating body are further embedded on the side of belt surface.

Both heating bodies 34 are designed to adjust the space from the belt 33.

The die roll press bonding portion 2 is composed of a linear roll 21, of which the peripheral surface, a single linear rib having a section of half circle 0.3 mm in height is provided, and an elastic roll 22. The elastic roll 22 has a width of 25 mm and has a structure made of a common roll which is covered with a sheet of silicone rubber elastic body 221 4 mm in thickness having a hardness of A 70.

The linear roll 21 has a width of 20 mm and a diameter of 50 mmφ. As shown in FIG. 11, a press bonding pressure adjusting spring 23 is attached to the shaft, and thereby, the press bonding pressure of the linear roll 21 can be adjusted by the application of spring pressure.

By using an air cylinder as the pressing apparatus, press bonding load can be adjusted easily by the control of air pressure. Furthermore, automatic vertical motion can be made under constant press bonding. Moreover, upon standing by the operation, the elastic roll 22 can be released from the load easily to decrease the wear of the elastic roll.

The linear roll 21 and the elastic roll 22 are engaged by a gear to synchronize their rotation. As a drive source, motor capable of conducting fine adjustment electrically is used, and their speed is agreed with the entering speed of work.

Between the belt conveying, heating and press bonding portion and the die roll press bonding portion, a temperature keeping portion 4 is provided.

Figure 12:
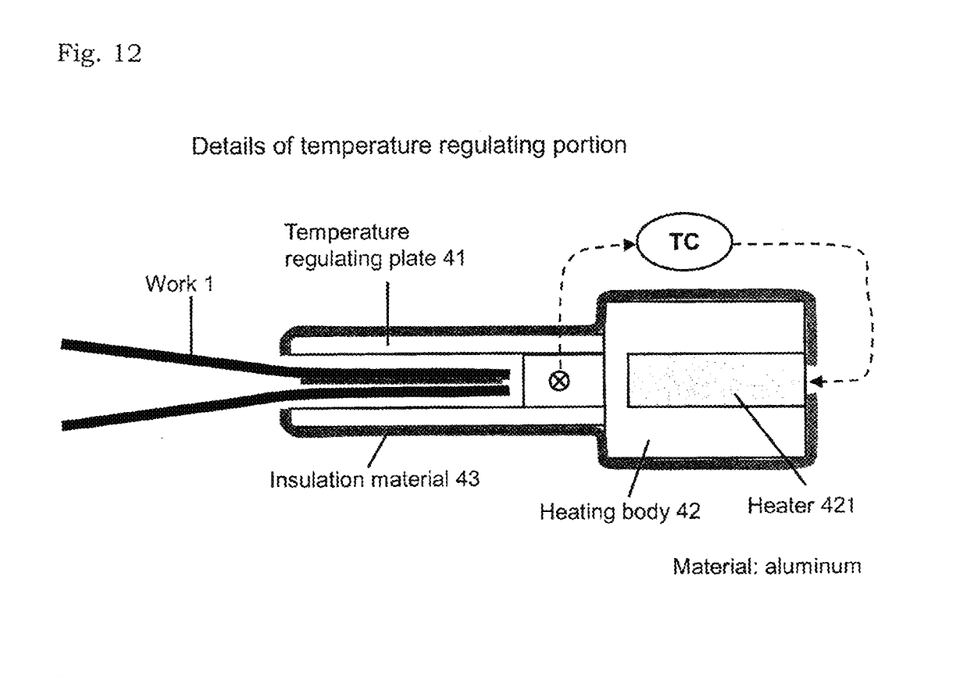
[FIG. 12] is a side sectional view illustrating schematic structure of the temperature regulating portion thereof.

This temperature keeping portion 4 has, of which the section is as shown in FIG. 12, a structure where two temperature keeping plates 41 are disposed in parallel on the upper and lower sides, and the right sides of the plates are fixed by a heating body including a heater 421, and the outer surface is covered by a temperature keeping material 43.

When heat-sealing is carried out using the apparatus as above, first, work 1 is conveyed from the right side in FIG. 10 followed by the arrow dotted line and entered from the space between rolls 32, 32. Then, while it is nipped by a pair of the belts 33, 33 and conveyed, it is heated from the upper and lower sides by the heating bodies 34, 34, and the heat seal layers are softened to be made into an interfacial bonding state.

Subsequently, the work 1 is released from the rolls 31, 31, and delivered to the die roll press bonding portion 2 while the temperature is kept by temperature keeping plates 41. Then, the work 1 is pressed by the linear roll 21 and the elastic roll 22, and is locally sunk into the elastic body 221 by the single linear rib 211 to form a single linear seal and transfers to press bonding of planar portions. 2 sheet portions are press bonded by the elastic body caused by its fluidity deformation corresponding to the difference in step between a 4 sheet portion and 2 sheet portions.

A laminated sheet composed of OPP 25 μm in thickness and an agglomeration destructed sealant 30 μm in thickness was used as a heat seal material to which Patent Document 3 was applied.

This was heated at 123° C. as the heating body surface temperature, at a conveying speed of 4 m/min for 3 seconds in the belt conveying, heating and press bonding portion, and the heat seal material discharged after 1.5 seconds from the temperature keeping plates was press bonded to form a composite heat seal structure at a press bonding pressure of 40 N/cm (die roll press bonding linear load 40 N) in the die roll press bonding portion. It is the characteristics of at least one embodiment that since press bonding is carried out separately by utilizing linear deformation, it is enough only by the application of press bonding properties to seal, irrespective of the heat seal size of packaging bag.

Figure 13:
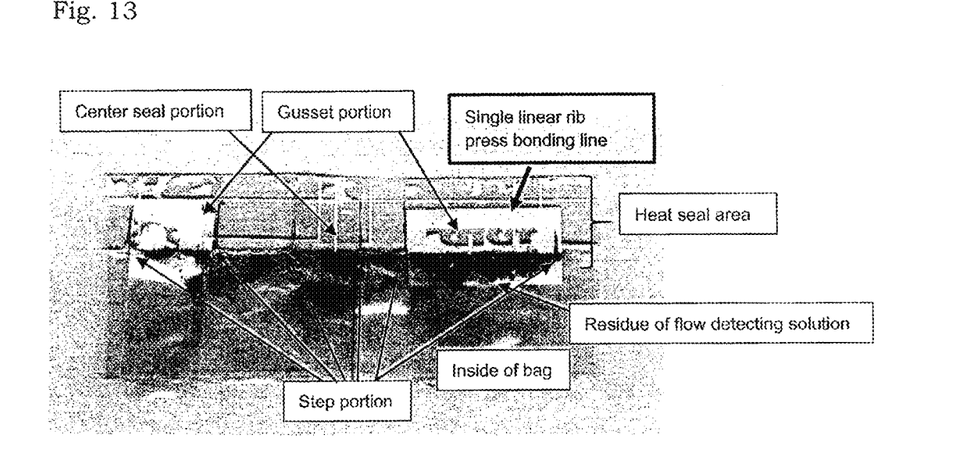
[FIG. 13] is a photograph demonstrating results of inspecting sealability of a bag heat-sealed by the above-mentioned heat-sealing apparatus.

As to the heat seal, the total width of band-shaped portions was 15 mm and the width of linear seal portion was 0.3 mm, and the heat seal was peelable seal capable of opening at about 8 N by nipping to pull it. A flaw detecting solution was dropped on the inside heat seal line to confirm the complete seal by the single linear seal in the whole heat seal area including step portions. A photograph of the state is shown in FIG. 13.

INDUSTRIAL APPLICABILITY

The heat-sealing apparatus and the heat-sealing method of at least one embodiment can be sealed efficiently even a packaging bag having a step portion on the heat seal surface, such as pillow type bag or a gusset bag, and they can be utilized widely for the heat-sealing of packaging bags, etc.

DESCRIPTION OF REFERENCE SINGS

1 Heat seal material (work)
2 Die roll press bonding portion
21 Linear roll
211 Single linear rib
22 Elastic roll
221 Elastic body
23 Press bonding pressure adjusting spring
3 Belt conveying, heating and press bonding portion
31 Drive roll
32 Follower roll
33 Belt
34 Heating body
341 Heater
342 Heating pipe
343 Heating body surface temperature sensor
4 Temperature keeping portion
41 Temperature keeping plate
42 Heating body
421 Heater
43 Temperature keeping material
5 Heating jaw type heat sealer
51 Heating body
511 Heater
512 Heating pipe
513 Temperature control sensor
514 Heating body surface temperature
52 Covering material
53 Intermittent motion
6 Band sealer
61 Drive roll
62 Sliding belt
63 Heating body
631 Heater 632 Heating pipe
633 Temperature control sensor
634 Heating body surface temperature
7 Welding face temperature

The invention claimed is:

1. A heat-sealing apparatus comprising:
   a belt conveying, heating and press bonding portion configured to convey and heat a heat seal material to form a band-shaped peelable seal, wherein the belt conveying, heating and press bonding portion comprises:
      a pair of belts, each of the pair of belts engaged to rollers and configured to travel between the rollers, and
      a heating body spaced from the pair of belts; and
   a die roll press bonding portion configured to add a linear peelable seal to the band-shaped peelable seal in a longitudinal direction of the band-shaped peelable seal for forming a composite heat seal structure, the die roll press bonding portion including
      a linear roller having a linear rib on a peripheral surface of the linear roller in a circumferential direction of the linear roller, and
      an elastic roller.

2. The heat-sealing apparatus as set forth in claim 1, wherein at least one of the rollers is configured to move in a direction perpendicular to a traveling direction of the pair of belts to control a space between the rollers and change press bonding pressure applied to the heat seal material.

3. The heat-sealing apparatus as set forth in claim 1, wherein the linear rib has a width ranging from 0.05 millimeters (mm) to 0.2 mm and a height ranging from 0.05 mm to 2 mm.

4. The heat-sealing apparatus as set forth in claim 1, wherein a width of a surface of the linear roller in contact with the elastic roll is identical to a width of the band-shaped peelable seal.

5. The heat-sealing apparatus as set forth in claim 1, wherein a peripheral surface of the elastic roller is covered with an elastic material sheet having a hardness of A 50 to A 80.

6. The heat-sealing apparatus as set forth in claim 1, wherein at least one of the linear roller or the elastic roller is configured to move in a direction perpendicular to the longitudinal direction to adjust press bonding pressure.

7. The heat-sealing apparatus as set forth in claim 1, further comprising:
   a temperature keeping portion between the belt conveying, heating and press bonding portion and the die roll press bonding portion.

8. The heat-sealing apparatus as set forth in claim 7, wherein the temperature keeping portion comprises a temperature keeping plate connected to a heat source.

9. The heat-sealing apparatus as set forth in claim 1, wherein said each of the pair of belts comprises a metal belt.

10. The heat-sealing apparatus as set forth in claim 9, wherein the metal belt comprises at least one of stainless steel, aluminum or brass and has a thickness ranging from 0.01 mm to 0.2 mm.

11. The heat-sealing apparatus as set forth in claim 1, wherein the heating body is surrounded by a belt of the pair of belts.

* * * * *